G. J. BAKER.
DIRIGIBLE HEADLIGHT.
APPLICATION FILED JUNE 30, 1911.
1,004,964.
Patented Oct. 3, 1911.
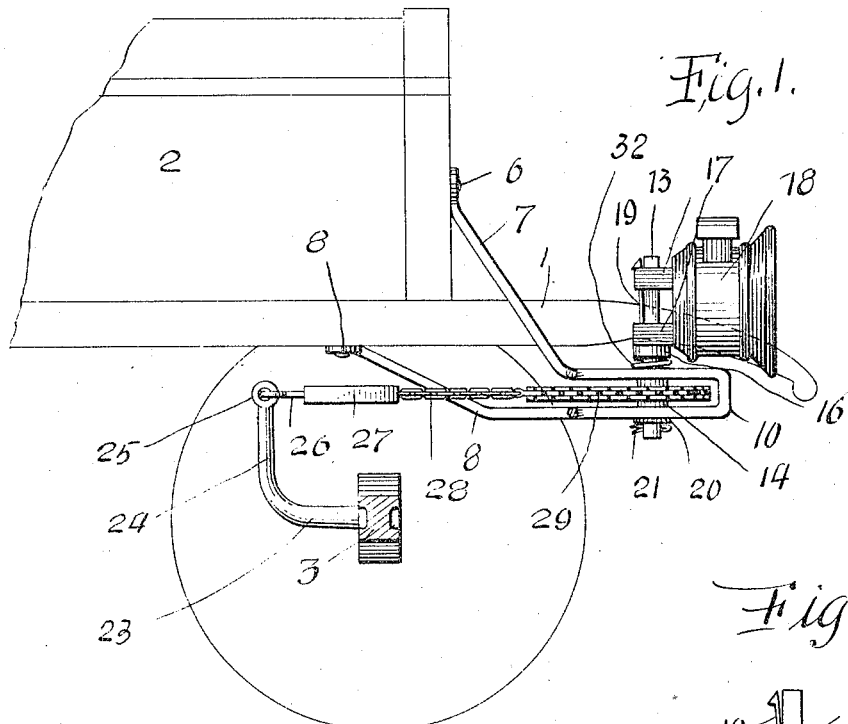
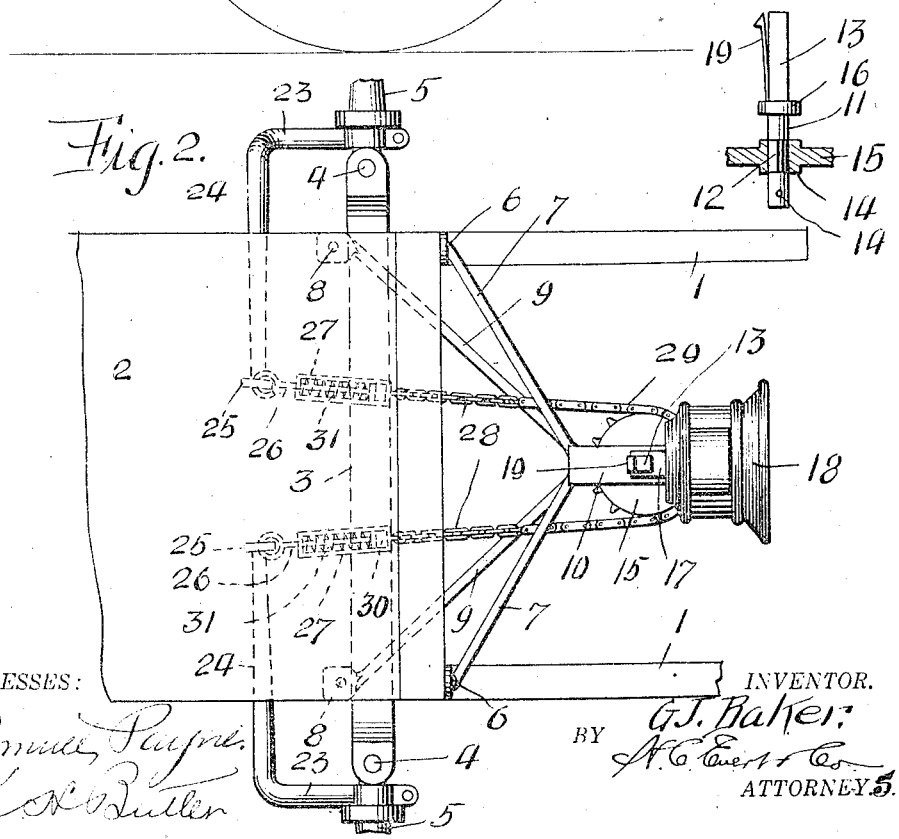
WITNESSES:
INVENTOR.
G. J. Baker
BY
ATTORNEYS.

UNITED STATES PATENT OFFICE.

GEORGE JOHN BAKER, OF REPUBLIC, PENNSYLVANIA, ASSIGNOR OF ONE-HALF TO PETER LACEY, OF REPUBLIC, PENNSYLVANIA.

DIRIGIBLE HEADLIGHT.

1,004,964. Specification of Letters Patent. Patented Oct. 3, 1911.

Application filed June 30, 1911. Serial No. 636,164.

*To all whom it may concern:*

Be it known that I, GEORGE JOHN BAKER, a citizen of the United States of America, residing at Republic, in the county of Fayette and State of Pennsylvania, have invented certain new and useful Improvements in Dirigible Headlights, of which the following is a specification, reference being had therein to the accompanying drawing.

This invention relates to dirigible head lights for vehicles, especially automobiles, and the objects of my invention are to furnish an automobile with a head light, lamp, or lanterns that will be automatically shifted to cast its rays of light in the path of the automobile, and to provide a mechanism for the above purpose that is applicable to various types of vehicles.

Further objects of my invention are to provide a vehicle with an automatically shifted lamp actuated through the medium of the steering post and spindles of the automobile, and to accomplish the above results by a mechanical construction, including tension devices that compensate for the differences in the movement of a vehicle body or the spindles of the forward axle of the vehicle.

With the above and other objects in view, the invention resides in the novel construction, combination and arrangement of parts to be hereinafter specifically described and then claimed.

Reference will now be had to the drawing herein:—Figure 1 is a longitudinal view of the lamp shifting mechanism as applied to an automobile; Fig. 2 is a plan of the same, and Fig. 3 is an elevation of a detached lamp.

The reference numeral 1 denotes the side frames of an automobile, 2 the engine hood supported by said frames, 3 an axle having knuckles 4, and wheel spindles 5,—all of these parts being common in the ordinary and well-known types of motor driven vehicles.

Secured to the forward end of the engine hood 2, at the side edges thereof, as at 6, are depending converging arms 7, and secured to the underneath side of the frames 1, as at 8, are forwardly projecting converging arms 9. The converging ends of the arms 7 and 9 are formed integral with a yoke 10 and revolubly mounted in said yoke is a vertical lamp post 11. The post 11 has rectangular portions 12 and 13, the former supporting the hub 14 of a horizontal sprocket wheel 15. The post 11 has a collar 16, adapted to support the rearwardly projecting brackets 17 of a lamp, lantern, or headlight 18. The brackets 17 fit over the rectangular portion 13 of the post and are retained thereon by a flat resilient catch 19 secured to the post. The catch is adapted to extend through the openings of the brackets 17 and engage the uppermost bracket, as best shown in Fig. 1. The upper end of the catch is beveled, whereby the brackets can easily ride over the upper end of said catch. The post is retained in engagement with the yoke 10 by the washer 20 and the cotter pin 21, arranged in an opening 22 provided therefor in the lower end of the post.

Suitably secured to the spindles 5 are the rearwardly projecting portions 23 of inwardly projecting arms 24, said arms having the inner ends thereof bent upwardly and apertured to provide eyes 25. Connected to the eyes 25 are the eyelet ends of rods 26, said rods extending into casings 27 attached to chains 28 of the ordinary type, said chains being connected to the ends of a sprocket chain 29 that passes over the sprocket wheel 15. The rods 26 within the casings 27 are provided with heads 30 and encircling said rods, between the rear ends of the casings and the heads 30 are coiled compression springs 31. The coiled compression spring 32 can be arranged between the collar 16 and the yoke 10 to cushion a movement of the lamp 18 relatively to the yoke 10, thereby preventing the lamp from being unduly jarred or subjected to vibrations that might injure the lamp.

As the body of the automobile is movably supported with respect to the axle 3, the body carrying the lamp can move, since the tension devices, including the elements 26, 27, 30 and 31 take up slack in the chains 28 and 29 and normally maintain the same taut.

It is apparent that when the spindles 5 are moved by the steering post of the automobile that the chain 29 will be shifted to rotate the post 11 in a direction that will carry the lamp 18 in a plane parallel to the forward wheels of the automobile; consequently, the rays of light will be always cast in the direction in which the automobile is traveling.

The invention, with a few changes, can be used in connection with a locomotive, and while in the drawing, there is illustrated a preferred embodiment of the invention, it is to be understood that the structural elements are susceptible to such changes as fall within the scope of the appended claims.

What I claim is:—

1. In a dirigible headlight for automobiles, the combination with side frames, an engine hood, and the wheel spindles of the automobile, of converging arms supported by said frames and said hood, a yoke carried by the forward ends of said arms, a post revolubly mounted in said yoke, lamp brackets detachably mounted upon said post and adapted to support a lamp, a sprocket wheel mounted upon said post within said yoke, inwardly projecting arms carried by said wheel spindles, and a flexible connection between said arms and including a sprocket chain passing around said sprocket wheel.

2. In a dirigible headlight for automobiles, the combination with side frames, an engine hood, and the wheel spindles of the automobile, of converging arms supported by said frames and said hood, a yoke carried by the forward ends of said arms, a post revolubly mounted in said yoke, lamp brackets detachably mounted upon said post and adapted to support a lamp, a sprocket wheel mounted upon said post within said yoke, inwardly projecting arms carried by said wheel spindles, chains connected to said arms, a sprocket chain connecting said chains together and passing around said sprocket wheel, and tension devices, including casings and springs attached to maintain said chains taut, and compensate for the movement between said arms and said yoke.

3. A dirigible headlight for automobiles comprising converging and forwardly-projecting arms supported from the machine, a yoke carried by the forward ends of said arms, a post revolubly mounted in said yoke, lamp supporting means carried by the post, a sprocket wheel connected to the post and positioned within the yoke, oppositely-disposed and inwardly-projecting arms carried by the forward wheel spindles of the machine and shifted thereby, and a shiftable flexible element connecting said arms together and including a sprocket chain engaging with said sprocket wheel for rotating the post when either of the inwardly projecting arms is shifted.

4. A dirigible headlight for automobiles comprising converging and forwardly-projecting arms supported from the machine, a yoke carried by the forward ends of said arms, a post revolubly mounted in said yoke, lamp supporting means carried by the post, a sprocket wheel connected to the post and positioned within the yoke, oppositely-disposed and inwardly-projecting arms carried by the forward wheel spindles of the machine and shifted thereby, and a shiftable flexible element connecting said arms together and including a sprocket chain engaging with said sprocket wheel for rotating the post when either of the inwardly projecting arms is shifted, said element further including a tensioning means for maintaining the same taut when said chain is shifted in either direction.

In testimony whereof I affix my signature in the presence of two witnesses.

GEORGE JOHN BAKER.

Witnesses:
Thomas McDermott,
John S. Griffiths.